United States Patent
Chen et al.

(10) Patent No.: US 9,538,378 B2
(45) Date of Patent: Jan. 3, 2017

(54) CONTROLLING ACCESS TO A LONG TERM EVOLUTION NETWORK VIA A NON-LONG TERM EVOLUTION ACCESS NETWORK

(71) Applicant: Verizon Patent and Licensing Inc., Arlington, VA (US)

(72) Inventors: Xuming Chen, San Ramon, CA (US); Imtiyaz Shaikh, Irving, TX (US); Sudhakar Reddy Patil, Irving, TX (US); Chien-Yuan Huang, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/676,029

(22) Filed: Apr. 1, 2015

(65) Prior Publication Data

US 2016/0295408 A1 Oct. 6, 2016

(51) Int. Cl.

| | |
|---|---|
| *H04W 4/00* | (2009.01) |
| *H04M 11/04* | (2006.01) |
| *H04W 12/06* | (2009.01) |
| *H04L 29/06* | (2006.01) |
| *H04W 76/00* | (2009.01) |
| *H04W 4/22* | (2009.01) |
| *G08B 25/01* | (2006.01) |
| *H04W 88/02* | (2009.01) |

(52) U.S. Cl.
CPC ............ *H04W 12/06* (2013.01); *G08B 25/016* (2013.01); *H04L 63/0876* (2013.01); *H04W 4/22* (2013.01); *H04W 76/007* (2013.01); *H04W 88/02* (2013.01)

(58) Field of Classification Search
CPC .......... H04W 4/22; H04W 8/00–8/245; H04W 3/5116
See application file for complete search history.

(56) References Cited

U.S. PATENT DOCUMENTS

| | | | | |
|---|---|---|---|---|
| 8,537,797 | B2 * | 9/2013 | Narkar .................... | H04W 8/00 370/338 |
| 2004/0005875 | A1 * | 1/2004 | Ko ........................ | H04W 12/12 455/410 |
| 2008/0026740 | A1 * | 1/2008 | Netanel ................ | G06Q 20/382 455/419 |
| 2009/0232019 | A1 * | 9/2009 | Gupta ................... | H04L 12/287 370/252 |
| 2010/0099412 | A1 * | 4/2010 | Ramachandran ..... | H04W 48/18 455/435.2 |
| 2011/0158090 | A1 * | 6/2011 | Riley ...................... | H04L 12/14 370/230 |

(Continued)

*Primary Examiner* — San Htun

(57) ABSTRACT

A device may receive, from an access network, a mobile device identifier. The mobile device identifier may identify a mobile device that is connected to the access network. The device may receive or determine subscriber information associated with the mobile device identifier. The subscriber information may identify one or more users associated with the mobile device. The device may provide the mobile device identifier and the subscriber information for determination of an action indicator. The action indicator may indicate an action to perform with respect to the mobile device identifier. The device may receive the action indicator based on providing the mobile device identifier and the subscriber information. The device may provide the action indicator for routing toward the mobile device for performance of the action.

20 Claims, 11 Drawing Sheets

(56) References Cited

U.S. PATENT DOCUMENTS

| | | | | |
|---|---|---|---|---|
| 2012/0077489 A1* | 3/2012 | Kosar | ............... | H04Q 3/0029 455/432.3 |
| 2013/0242754 A1* | 9/2013 | Shaikh | ............... | H04W 24/04 370/242 |

* cited by examiner

CONTROLLING ACCESS TO A LONG TERM EVOLUTION NETWORK VIA A NON-LONG TERM EVOLUTION ACCESS NETWORK

BACKGROUND

A mobile device may be identified by a mobile device identifier. A network operator may wish to control access to a network and/or a network service based on authentication of the mobile device identifier and/or based on an identity of a subscriber associated with the mobile device (e.g., a user of the mobile device).

DETAILED DESCRIPTION OF PREFERRED EMBODIMENTS

The following detailed description of example implementations refers to the accompanying drawings. The same reference numbers in different drawings may identify the same or similar elements.

A first type of access network, such as a long term evolution (LTE) network, may use a mobile device identifier to determine whether to permit or deny a mobile device access to a network service provided via the first type of access network. When the mobile device attempts to access the network service via a second type of access network, such as a WiFi access network, a High-Rate Packet Data (HRPD) access network, or the like, the second type of access network may not be capable or recognizing or using the mobile device identifier. A network operator may want to be able to recognize the mobile device on the second type of access network, for example, to provide emergency services (e.g., Enhanced 911 (E911) services), to prevent lost or stolen mobile devices from accessing a network service, to allow or prevent a particular type, model, etc., of mobile device from accessing the network service, or the like. Implementations described herein may assist a network operator in determining the mobile device via the second type of access network.

Figure 1A:
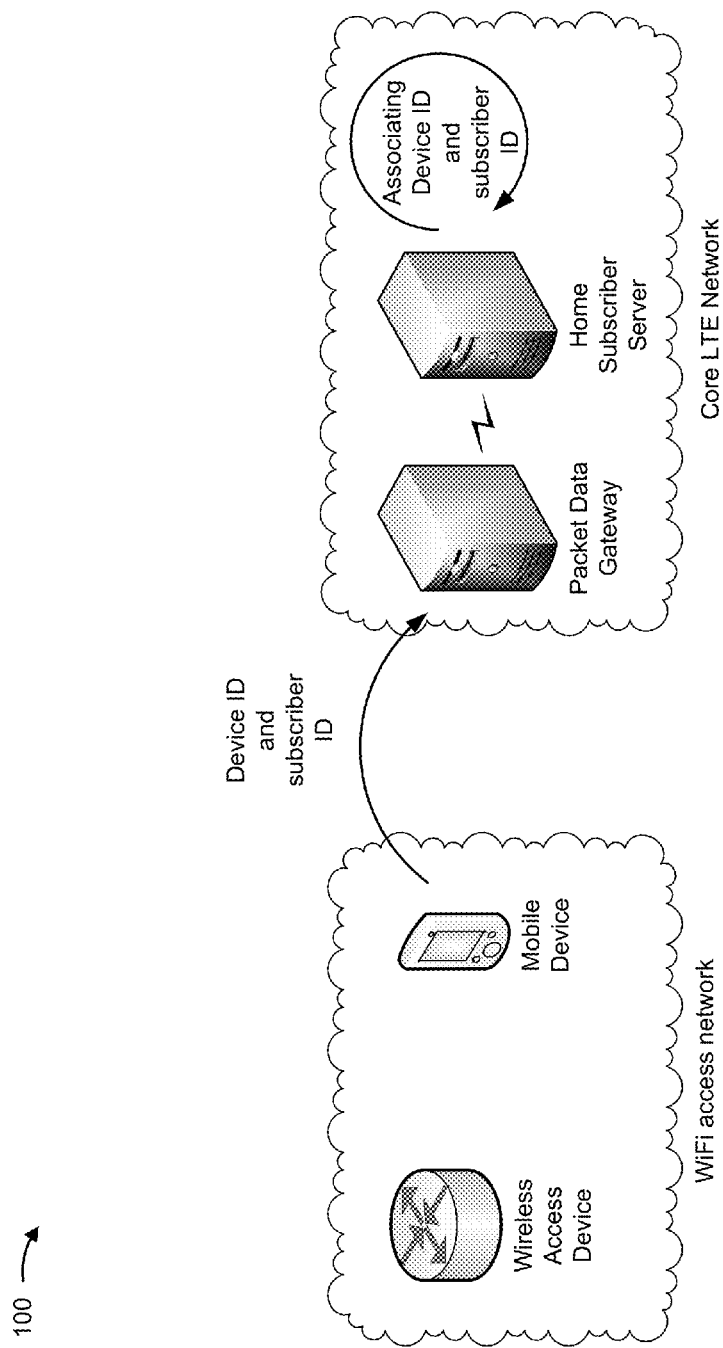
FIGS. 1A and 1B are diagrams of an overview of an example implementation described herein.
Figure 1B:
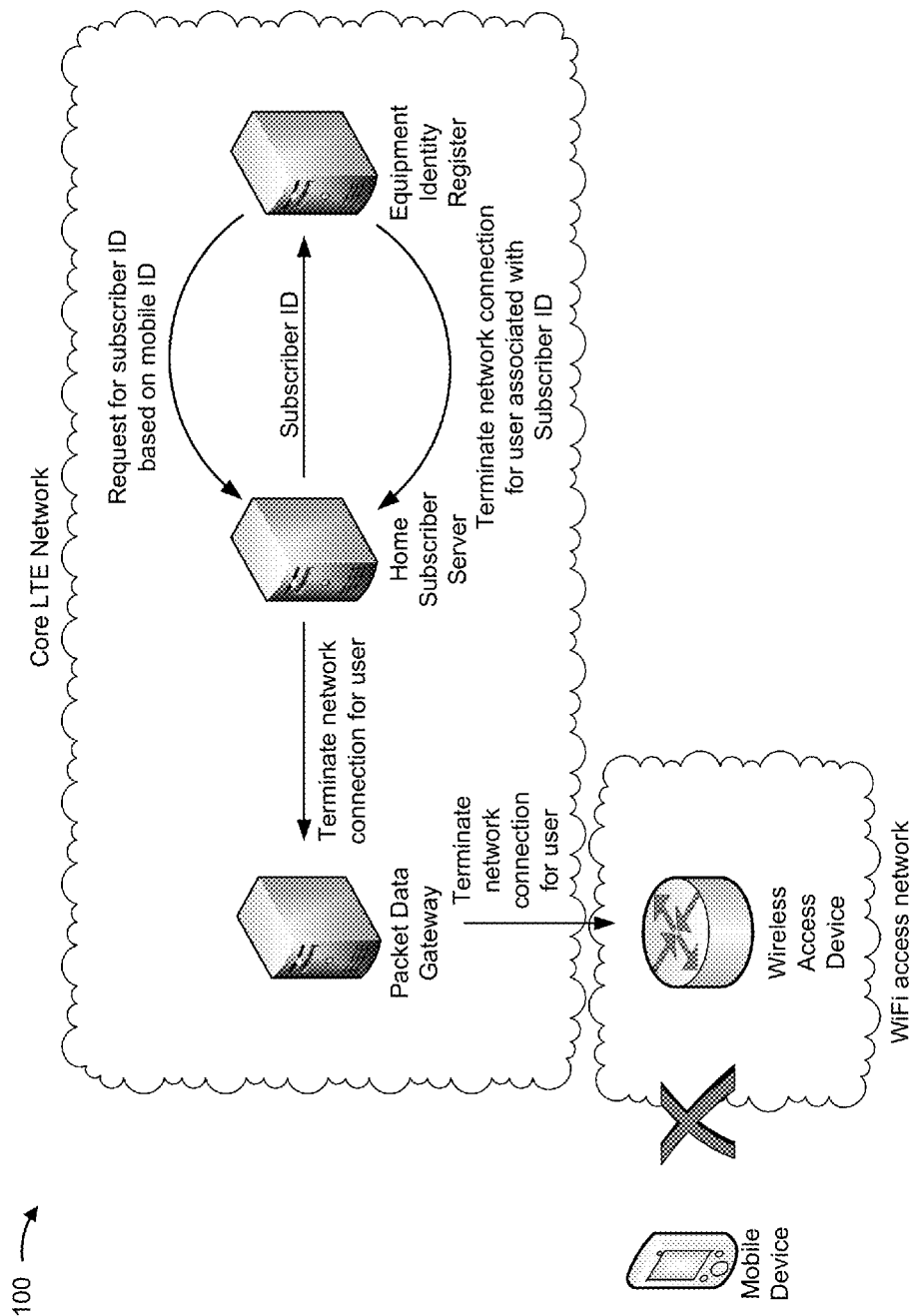

FIGS. 1A and 1B are diagrams of an overview of an example implementation 100 described herein. As shown in FIG. 1A, a mobile device may connect to a network (e.g., a WiFi access network provided by a wireless access device). Assume that the mobile device is associated with a mobile device identifier and subscriber information (e.g., shown as "Device ID" and "subscriber ID"). Assume that the mobile device identifier identifies the mobile device (e.g., based on an International Mobile Station Equipment Identity (IMEI), a media access control (MAC) address, etc.), and that the subscriber information identifies a subscriber associated with the mobile device (e.g., based on an International Mobile Subscriber Identity (IMSI), based on a subscriber identity module (SIM) card, etc.). As shown, the mobile device may provide the mobile device identifier and the subscriber information to a packet data gateway (e.g., via the wireless access device). As shown, the packet data gateway may provide the mobile device identifier and the subscriber information to a home subscriber server associated with a core LTE network. As shown, assume that the home subscriber server associates and/or stores the mobile device identifier and the subscriber information.

As shown in FIG. 1B, an equipment identity register may provide a request for subscriber information based on a mobile device identifier. Assume that the equipment identity register provides, with the request for subscriber information, the mobile device identifier that identifies the mobile device. As shown, the home subscriber server may provide, to the equipment identity register, the subscriber information. Assume that the home subscriber server determines and/or provides the subscriber information based on the association between the subscriber information and the mobile device identifier. Assume further that the equipment identity register determines that a network connection with the mobile device is to be terminated (e.g., based on authentication information stored by the equipment identity register indicating that the mobile device is stolen, that the mobile device is of a type not permitted to access the core LTE network and/or a network service of the core LTE network, etc.).

As shown, the equipment identity register may provide, to the home subscriber server, an action indicator indicating an action to perform related to the mobile device and/or the subscriber (e.g., shown as "terminate network connection for subscriber"). As shown, the home subscriber server may provide the action indicator to a packet data gateway that facilitates communication between the WiFi access network and the core LTE network. Assume that the action indicator is routed from the home subscriber server to the packet data gateway by one or more network devices. As shown, the packet data gateway may perform the action indicated by the action indicator (e.g., may end a network connection between the packet data gateway and the wireless access device, may cause the wireless access device to end a network connection between the wireless access device and the mobile device, etc.).

In this way, network devices of a core LTE network may control access by a mobile device that is connected to the core LTE network via a non-LTE access network. The network devices of the core LTE network may receive, via the non-LTE access network, a mobile device identifier that identifies the mobile device. The network devices of the core LTE network may determine an action indicator that indicates an action to perform, such as ending a connection with the mobile device or permitting the mobile device to access a service, based on the device identifier and based on information stored by a network device. The network devices may perform the action, which may prevent a lost, stolen, unauthorized, or compromised mobile device from accessing the core LTE network, or may enable any mobile device to access network services (e.g., emergency network services).

Figure 2:
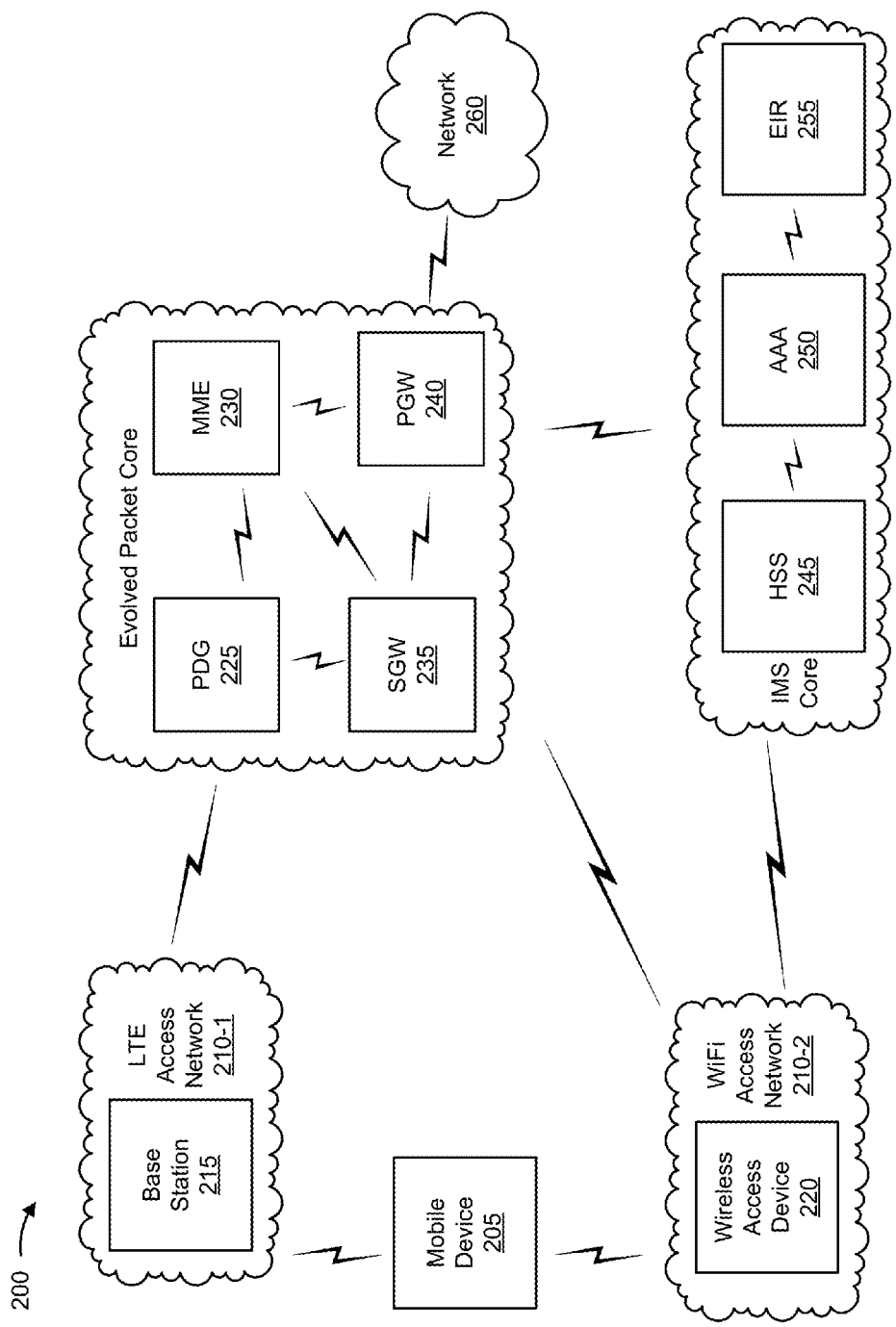
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205, a set of access networks 210-1 to 210-N (N≥1) (hereinafter referred to collectively as "access networks 210," and individually as "access network 210"), a base station 215, a wireless access device 220, a packet data gateway (PDG) 225, a mobility management entity (MME) device 230, a serving gateway (SGW) 235, a packet data network (PDN) gateway (PGW) 240, a home subscriber server (HSS) 245, an authentication authorization and accounting (AAA) device 250, an equipment identity register (EIR) 255, and a network 260. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

As shown in FIG. 2, environment 200 may include an evolved packet system (EPS) that includes an LTE network and/or an evolved packet core (EPC) that operate based on a third generation partnership project (3GPP) wireless communication standard. The LTE network may include an LTE access network 210-1 that includes one or more base stations 215 that take the form of evolved Node Bs (eNBs) via which mobile device 205 communicates with the EPC. The EPC may include PDG 225, MME 230, SGW 235, and/or PGW 240 that enable mobile device 205 to communicate with network 260 and/or an Internet protocol (IP) multimedia subsystem (IMS) core. The IMS core may include HSS 245, AAA 250, and/or EIR 255, and may manage device registration and authentication, session initiation, etc., associated with mobile device 205. HSS 245, AAA 250, and/or EIR 255 may reside in the EPC and/or the IMS core.

Mobile device 205 may include one or more devices capable of communicating with base station 215 and/or wireless access device 220. For example, mobile device 205 may include a device, such as a mobile phone (e.g., a smart phone, a radiotelephone, etc.), a laptop computer, a tablet computer, a handheld computer, a gaming device, or a similar type of device. Mobile device 205 may send traffic to and/or receive traffic from network 260 (e.g., via base station 215 and/or wireless access device 220).

Access network 210 may include one or more networks capable of connecting mobile device 205 with a core LTE network (e.g., an evolved packet core, an IMS core, or the like). For example, access network 210 may include a cellular network (e.g., an LTE network, a 4G network, a 3G network, a code division multiple access (CDMA) network, etc.), a public land mobile network (PLMN), a local area network (LAN), a wireless local area network (WLAN), such as a WiFi network, a wide area network (WAN), a metropolitan area network (MAN), a private network, an ad hoc network, a fiber optic-based network, a High-Rate Packet Data network, or the like, and/or a combination of these or other types of networks.

Base station 215 may include one or more devices capable of communicating with mobile device 205 using a cellular radio access technology. For example, base station 215 may include a base transceiver station, a radio base station, a node B, an evolved node B (eNB), a base station subsystem, a cellular tower (e.g., a cell phone tower, a mobile phone tower, etc.), a radio access node, or a similar type of device. Base station 215 may transfer traffic between mobile device 205 and network 260.

Wireless access device 220 may include one or more devices (e.g., one or more traffic transfer devices) capable of processing and/or transferring traffic between mobile device 205 and the core LTE network and/or LTE access network 210-1. For example, wireless access device 220 may include a router, a gateway, an access point, a modem, a switch, a hub, a bridge, or a similar device. Wireless access device 220 may be associated with WiFi access network 210-2, and may provide a mobile device identifier, associated with LTE access network 210-1, to PDG 225. In some implementations, wireless access device 220 may use a WiFi radio access technology to communicate with mobile device 205. In some implementations, wireless access device 220 may use another type of radio access technology to communicate with mobile device 205, such as a High-Rate Packet Data (HRPD) radio access technology, or the like.

PDG 225 may include one or more devices capable of providing network connectivity for mobile device 205 via wireless access device 220. For example, PDG 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PDG 225 may receive traffic from mobile device 205 via a non-Third Generation Partnership Project (3GPP) connection, such as a WiFi connection, or the like. In such implementations, PDG 225 may function as an evolved packet data gateway (ePDG). Additionally, or alternatively, PDG 225 may function as another type of packet data network gateway. For example, PDG 225 may receive traffic from mobile device 205 via a type of access network connection other than a WiFi access network connection, and may function as a type of packet data network gateway associated with the type of connection. PDG 225 may communicate with mobile device 205 based on a logical interface, such as an SWu logical interface, or the like.

MME 230 may include one or more devices, such as one or more server devices, capable of managing authentication, activation, deactivation, and mobility functions associated with mobile device 205. In some implementations, MME 230 may perform operations relating to authentication of mobile device 205. MME 230 may perform operations associated with handing off mobile device 205 from a first base station 215 to a second base station 215 when mobile device 205 is transitioning from a first cell associated with the first base station 215 to a second cell associated with the second base station 215.

SGW 235 may include one or more devices capable of routing traffic. For example, SGW 235 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 235 may aggregate traffic received from one or more base stations 215, and may send the aggregated traffic to network 260 (e.g., via PGW 240) and/or other network devices associated with the EPC and/or the IMS core. SGW 235 may also receive traffic from network 260 and/or other network devices, and may send the received traffic to mobile device 205 via base station 215. Additionally, or alternatively, SGW 235 may perform operations associated with handing off mobile device 205 to and/or from access network 210 (e.g., an LTE network). In some implementations, SGW 235 may include a High-Rate Packet Data (HRPD) Serving Gateway (HSGW) to perform the functions of SGW 235 for an HRPD access network 210 and/or network 260.

PGW 240 may include one or more devices capable of providing connectivity for mobile device 205 to external packet data networks. For example, PGW 240 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 240 may aggregate traffic received from one or more SGWs 235, and may send the aggregated traffic to network 260. Additionally, or alternatively, PGW 240 may receive traffic from network 260, and may send the traffic to mobile device 205 via SGW 235 and base station 215.

HSS 245 may include one or more devices, such as one or more server devices, capable of managing (e.g., receiving, generating, storing, processing, and/or providing) information associated with mobile device 205. For example, HSS 245 may manage subscriber information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 245 may provide this information to one or more other devices of environment 200 to support the operations performed by those devices.

AAA 250 may include one or more devices, such as one or more server devices, that perform authentication, authorization, and/or accounting operations for communication sessions associated with mobile device 205. For example, AAA 250 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

EIR 255 may include one or more devices, such as one or more server devices, capable of managing (e.g., receiving, generating, storing, processing, and/or providing) authentication information associated with mobile device identifiers. For example, EIR 255 may manage a list of mobile device identifiers that are associated with lost or stolen mobile devices 205, and/or a list of mobile device identifiers that are associated with mobile devices 205 permitted to access the network. EIR 255 may provide this information to one or more other devices of environment 200 to support the operations performed by those devices. EIR 255 may determine and/or generate an action indicator based on the authentication information that indicates an action to perform with respect to mobile device 205 and/or a user of mobile device 205.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
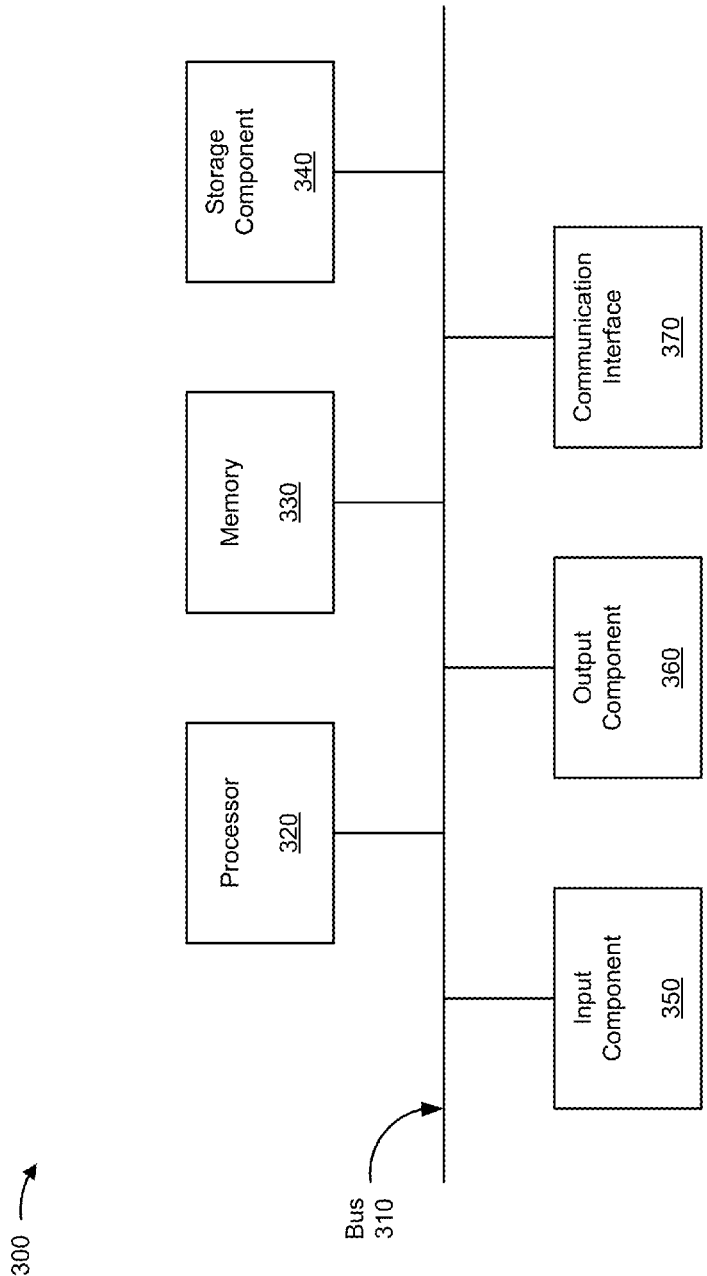
FIG. 3 is a diagram of example components of one or more devices of FIG. 2.

FIG. 3 is a diagram of example components of a device 300. Device 300 may correspond to mobile device 205, base station 215, wireless access device 220, PDG 225, MME 230, SGW 235, PGW 240, HSS 245, AAA 250, and/or EIR 255. In some implementations, mobile device 205, base station 215, wireless access device 220, PDG 225, MME 230, SGW 235, PGW 240, HSS 245, AAA 250, and/or EIR 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
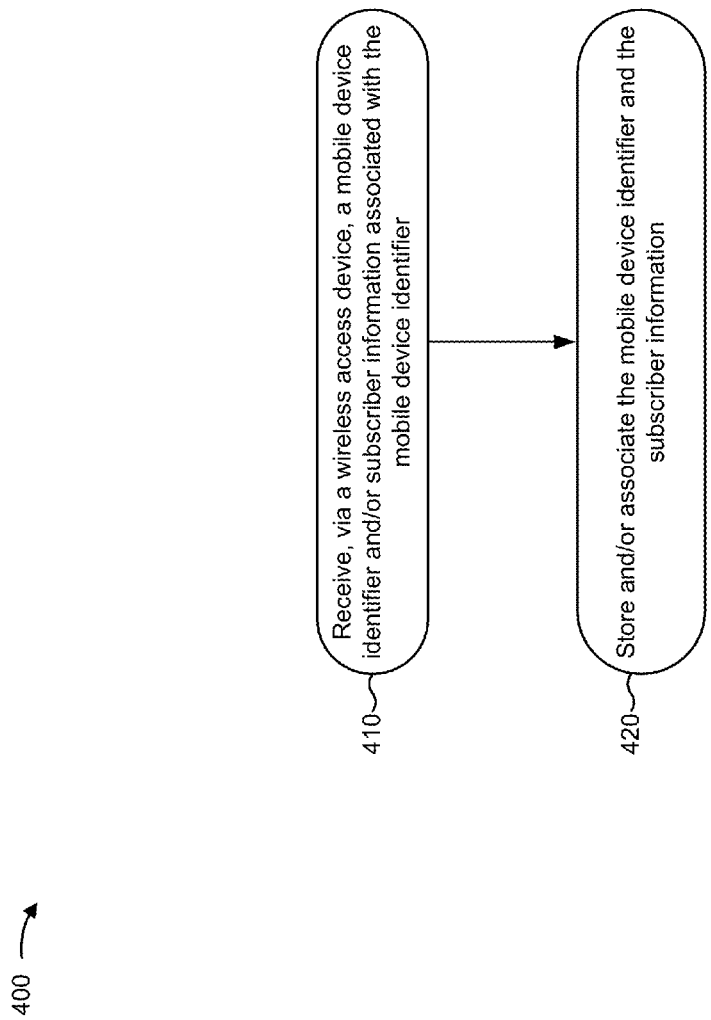
FIG. 4 is a flow chart of an example process for receiving and/or storing a mobile device identifier and/or subscriber information.

FIG. 4 is a flow chart of an example process 400 for receiving and/or storing a mobile device identifier and/or subscriber information. In some implementations, one or more process blocks of FIG. 4 may be performed by HSS 245. In some implementations, one or more process blocks of FIG. 4 may be performed by another device or a set of devices separate from or including HSS 245, such as mobile device 205, base station 215, wireless access device 220, PDG 225, MME 230, SGW 235, PGW 240, AAA 250, and/or EIR 255.

As shown in FIG. 4, process 400 may include receiving, via a wireless access device, a mobile device identifier and/or subscriber information associated with the mobile device identifier (block 410). For example, HSS 245 may receive a mobile device identifier that identifies mobile device 205 and/or may receive subscriber information that identifies a user that is using mobile device 205. HSS 245 may receive the mobile device identifier and/or the subscriber information via wireless access device 220 (e.g., based on mobile device 205 being connected to an access network 210 provided by wireless access device 220). In some implementations, HSS 245 may receive the mobile device identifier from and/or via another device (e.g., PDG 225, MME 230, SGW 235, PGW 240, AAA 250, etc.). HSS 245 may associate the mobile device identifier and the subscriber information, and may provide the mobile device identifier and/or the subscriber information to other devices (e.g., EIR 255, or the like) to facilitate controlling access to network services.

The mobile device identifier may include an international mobile station equipment identity (IMEI), a mobile equipment identifier (MEID), an electronic serial number (ESN), a mobile directory number (MDN), a media access control (MAC) address, a serial number, or a similar identifier. In some implementations, the mobile device identifier may be used to identify mobile device 205 on a cellular network (e.g., a 3G network, a 4G network, an LTE network, or the like).

In some implementations, the mobile device identifier may be associated with a lost, stolen, unauthorized, and/or compromised mobile device 205. For example, a malicious party may find, steal, or compromise mobile device 205. In some implementations, the malicious party may provide subscriber information to access a network service via the core LTE network (e.g., based on logging into the network service using subscriber information as a login credential, based on inserting a SIM card into mobile device 205, etc.). One or more network devices of the core LTE network may use the mobile device identifier and/or the subscriber information to identify mobile device 205 and/or to determine an action to perform with respect to mobile device 205 and/or the user, as described in more detail elsewhere herein.

In some implementations, the mobile device identifier may indicate a type of mobile device 205. For example, a mobile device identifier within a first range of mobile device identifiers may identify a smart phone, a mobile device identifier within a second range of mobile device identifiers may identify a laptop computer, a mobile device identifier within a third range of mobile device identifiers may identify an LTE hotspot, and so on. A network device associated with an LTE network may perform an action based on a type of mobile device 205 and/or a range of mobile device identifiers. For example, assume that a network provider wants to prevent tablet computers from accessing a network service. The network provider may provide, to EIR 255, information that causes EIR 255 to blacklist a range of mobile device identifiers that correspond to tablet computers. In this way, the network provider may control access by a type of mobile device 205 based on a range of mobile device identifiers, which may enable the network provider to more effectively control access to the LTE network and/or a service provided via the LTE network.

The subscriber information may include information that identifies a user of mobile device 205 (e.g., an MDN, a SIM, a uniform resource identifier (URI), a mobile identification number (MIN), an international mobile subscriber identity (IMSI), a mobile subscriber integrated services digital network (MSISDN) identifier, a national access identifier (NAI), etc.) and/or other information associated with the user. In some implementations, mobile device 205 may provide the subscriber information to HSS 245. For example, mobile device 205 may receive and/or determine the subscriber information (e.g., based on a user inputting the subscriber information, based on the user inserting a SIM card into mobile device 205, etc.), and may provide the subscriber information to HSS 245 (e.g., via base station 215 and/or wireless access device 220).

In some implementations, mobile device 205 may provide the mobile device identifier to PDG 225 based on a logical interface adapted to carry the mobile device identifier. For example, if mobile device 205 is connected to a non-LTE access network 210 provided by wireless access device 220, the logical interface may include an SWu logical interface between mobile device 205 and PDG 225. In some implementations, the SWu logical interface may be adapted to carry the mobile device identifier. Mobile device 205 may provide the mobile device identifier and/or the subscriber information to PDG 225 based on the SWu logical interface. In this way, mobile device 205 may provide a mobile device identifier to PDG 225 via an adapted SWu logical interface, which may enable HSS 245 and/or another network device to determine the mobile device identifier of a mobile device 205 that is connected to the core LTE network via wireless access device 220.

In some implementations, HSS 245 may receive the mobile device identifier and/or the subscriber information from or via base station 215. In such implementations, HSS 245 may receive the mobile device identifier and/or the subscriber information via one or more devices associated with an LTE network connection (e.g., MME 230, SGW 235, PGW 240, etc.). In some implementations, HSS 245 may receive the mobile device identifier and/or the subscriber information from and/or via wireless access device 220. In such implementations, HSS 245 may receive the mobile device identifier and/or the subscriber information via one or more devices associated with a non-3GPP connection (e.g., PDG 225, PGW 240, etc.). PDG 225 may perform functions of an ePDG to determine the mobile device identifier (e.g., based on an SWu logical interface) and/or provide the mobile device identifier and/or the subscriber information to HSS 245.

In some implementations, HSS 245 may receive the mobile device identifier and/or the subscriber information based on mobile device 205 connecting to base station 215 and/or wireless access device 220. For example, base station 215 and/or wireless access device 220 may determine and/or provide the mobile device identifier and/or the subscriber information upon connecting with mobile device 205. In some implementations, HSS 245 may receive the mobile device identifier and/or the subscriber information based on mobile device 205 requesting a network service. For example, mobile device 205 may provide the mobile device identifier and/or the subscriber information based on a user of mobile device 205 attempting to access a network service (e.g., the service may request the mobile device identifier and/or the subscriber information, may request the subscriber information as a login credential, etc.).

In some implementations, HSS 245 may determine an association between mobile device 205 and subscriber information. For example, HSS 245 may receive a mobile device identifier and subscriber information. HSS 245 may associate the mobile device identifier and the subscriber information. In some implementations, HSS 245 may associate the mobile device identifier and the subscriber information based on receiving the mobile device identifier in association with the subscriber information. For example, HSS 245 may receive the mobile device identifier and the subscriber information from a single device, via a single access network 210, as part of a single message, or the like, and may associate the mobile device identifier and the subscriber information accordingly.

In some implementations, HSS 245 may receive multiple mobile device identifiers and/or subscriber information that identifies multiple users. For example, a single user may use multiple mobile devices 205, multiple users may use multiple mobile devices 205, multiple users may use a single mobile device 205, or the like. HSS 245 may receive multiple mobile device identifiers and/or subscriber information that identifies the multiple users, and may receive and/or determine information indicating one or more associations between the multiple mobile device identifiers and/or the subscriber information.

As further shown in FIG. 4, process 400 may include storing and/or associating the mobile device identifier and the subscriber information (block 420). For example, HSS 245 may store the mobile device identifier and/or the subscriber information. In some implementations, HSS 245 may determine an association between the mobile device identifier and the subscriber information, and may store the mobile device identifier and the subscriber information in a manner that indicates the association. Based on the stored information, HSS 245 or another device (e.g., MME 230, AAA 250, EIR 255, etc.) may control access to network services by mobile device 205 and/or a user associated with (e.g., using) mobile device 205.

In some implementations, HSS 245 may store information indicating a source of the mobile device identifier and/or the subscriber information. For example, HSS 245 may receive the mobile device identifier and/or the subscriber information from wireless access device 220. In that case, HSS 245 may store information indicating that wireless access device 220 is a source of the mobile device identifier and/or the subscriber information. As another example, HSS 245 may receive the mobile device identifier and/or the subscriber information from base station 215. In that case, HSS 245 may store information indicating that base station 215 is a source of the mobile device identifier and/or the subscriber information. HSS 245 may use the information indicating the source to route an action indicator toward mobile device 205, which may enable one or more network devices to perform the action indicated by the action indicator.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
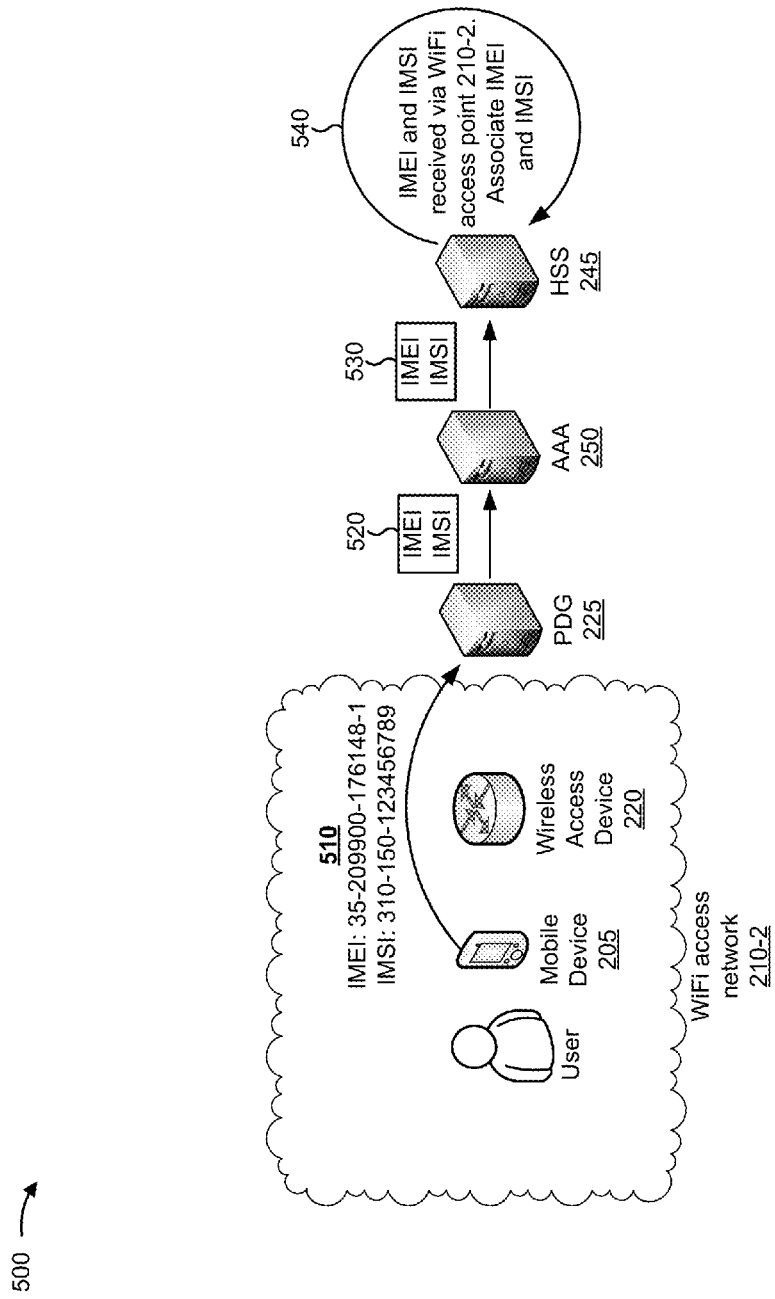
FIG. 5 is a diagram of an example implementation relating to the example process shown in FIG. 4.

FIG. 5 is a diagram of an example implementation 500 relating to example process 400 shown in FIG. 4. FIG. 5 shows an example of receiving and/or storing a mobile device identifier and/or subscriber information. For the purpose of FIG. 5, assume that mobile device 205 is identified by a mobile device identifier (e.g., shown as an IMEI of 35-209900-176148-1). Assume further that a user of mobile device 205 is identified by subscriber information (e.g., shown as an IMSI of 310-150-123456789). Assume further that mobile device 205 is connected to WiFi access network 210-2, provided by wireless access device 220. Assume that wireless access device 220 facilitates connecting to a core LTE network (e.g., wireless access device 220 may be an LTE hotspot that communicates with the core LTE network, or the like).

As shown in FIG. 5, and by reference number 510, mobile device 205 may provide, to PDG 225 and via wireless access device 220, a mobile device identifier that identifies mobile device 205 and subscriber information associated with a user of mobile device 205. Assume that mobile device 205 provides the mobile device identifier and the subscriber information based on connecting to WiFi access network 210-2 via wireless access device 220. Assume further that mobile device 205 provides the mobile device identifier and the subscriber information based on an SWu logical interface between mobile device 205 and PDG 225. As shown by reference number 520, PDG 225 may provide the mobile device identifier and the subscriber information to AAA 250. Assume that PDG 225 provides the mobile device identifier and the subscriber information to AAA 250 for routing to HSS 245.

As shown by reference number 530, AAA 250 may route the mobile device identifier and the subscriber information to HSS 245. As shown by reference number 540, HSS 245 may receive the mobile device identifier and the subscriber information. As further shown, assume that HSS 245 determines an association between the mobile device identifier and the subscriber information, and assume that HSS 245 stores the mobile device identifier and the subscriber information in a manner that indicates the association. Assume that HSS 245 associates the mobile device identifier and the subscriber information based on receiving the mobile device identifier in association with the subscriber information.

As indicated above, FIG. 5 is provided merely as an example. Other examples are possible and may differ from what was described with regard to FIG. 5.

Figure 6:
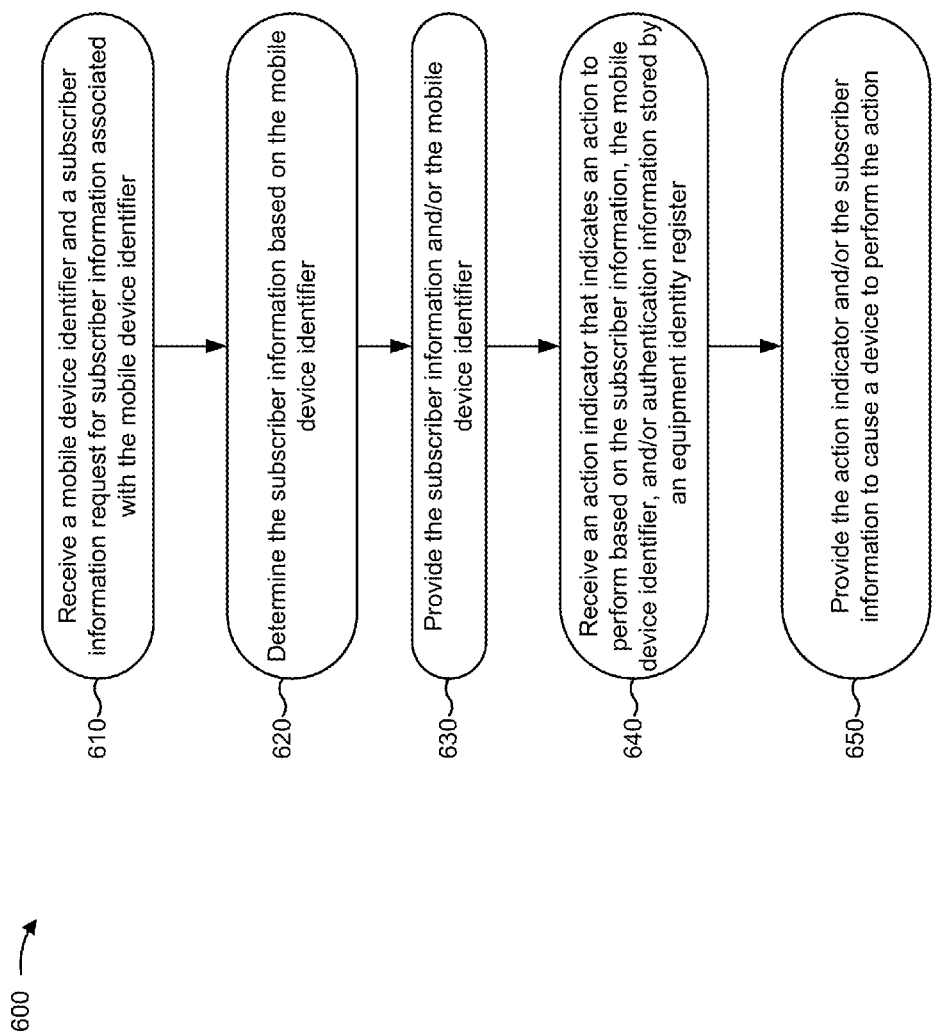
FIG. 6 is a flow chart of an example process for receiving and/or providing an action indicator based on a mobile device identifier and/or subscriber information.

FIG. 6 is a flow chart of an example process 600 for receiving and/or providing an action indicator based on a mobile device identifier and/or subscriber information. In some implementations, one or more process blocks of FIG. 6 may be performed by HSS 245. In some implementations, one or more process blocks of FIG. 6 may be performed by another device or a set of devices separate from or including HSS 245, such as mobile device 205, base station 215, wireless access device 220, PDG 225, MME 230, SGW 235, PGW 240, AAA 250, and/or EIR 255.

As shown in FIG. 6, process 600 may include receiving a mobile device identifier and a subscriber information request for subscriber information associated with the mobile device identifier (block 610). For example, HSS 245 may receive a subscriber information request. The subscriber information request may request subscriber information associated with a mobile device identifier, and may include the mobile device identifier. HSS 245 may determine and/or provide subscriber information based on the subscriber information request and/or the mobile device identifier, which may allow another device (e.g., EIR 255) to control access by mobile device 205 to network services via different access networks 210.

HSS 245 may receive the subscriber information request from EIR 255 for the purpose of controlling access to the core LTE network and/or network services. For example, a mobile device identifier may be blacklisted from the core LTE network, and EIR 255 may transmit the subscriber information request to ensure that no user is currently connected to the core LTE network using mobile device 205. In this way, network devices may determine a mobile device identifier of mobile device 205, even when mobile device 205 is connected to the core LTE network via a non-LTE access network 210, which may enable the network devices to control access to the core LTE network and/or network services via the non-LTE access network 210.

In some implementations, HSS 245 may receive the subscriber information request based on EIR 255 receiving authentication information. For example, after receiving authentication information associated with a mobile device identifier, EIR 255 may transmit the subscriber information request to determine subscriber information that identifies a user associated with the mobile device identifier. Based on the subscriber information, EIR 255 may generate an action indicator to cause one or more network devices to perform an action related to the user and/or mobile device 205.

In some implementations, HSS 245 may receive a subscriber information request that includes multiple mobile device identifiers (e.g., a range of mobile device identifiers, a type of mobile device identifier, a set of mobile device identifiers that satisfy a particular criterion, etc.). For example, a network service provider may determine that a set of smart phones has been stolen that are identified by a set of mobile device identifiers. The network service provider may provide a subscriber information request for the set of mobile device identifiers to determine subscriber information that is associated with the set of mobile device identifiers.

As further shown in FIG. 6, process 600 may include determining the subscriber information based on the mobile device identifier (block 620). For example, HSS 245 may determine subscriber information based on the mobile device identifier. In some implementations, HSS 245 may determine the subscriber information based on storing the subscriber information in association with the mobile device identifier. HSS 245 may provide the subscriber information to another network device to aid the other network device in controlling access to network services.

As further shown in FIG. 6, process 600 may include providing the subscriber information and/or the mobile device identifier (block 630). For example, HSS 245 may provide the subscriber information. In some implementations, HSS 245 may provide the subscriber information to a device that provided the subscriber information request (e.g., EIR 255, etc.). In some implementations, HSS 245 may provide the mobile device identifier with the subscriber information (e.g., to facilitate operations of EIR 255, etc.). The device that provided the subscriber information request may use the subscriber information to determine a mobile device 205 associated with a particular user, to cause the one or more network devices to perform an action related to the particular user and/or mobile device 205, or the like.

In some implementations, HSS 245 may provide the subscriber information and/or the mobile device identifier to EIR 255. For example, HSS 245 may provide the subscriber information and/or the mobile device identifier to EIR 255 for determining an action indicator based on the subscriber information, the mobile device identifier, and/or authentication information stored by EIR 255. EIR 255 may determine an action indicator based on the mobile device identifier and/or the subscriber information. The action indicator may indicate an action to perform related to a user and/or mobile device 205. For example, the action indicator may indicate to drop network traffic association with a user, to terminate or deny a network connection with mobile device 205, to permit a network connection with mobile device 205, to monitor a network connection with mobile device 205, to allow mobile device 205 to access a particular service, to deny mobile device 205 access to the particular service, or the like, as described in more detail below.

As further shown in FIG. 6, process 600 may include receiving an action indicator that indicates an action to perform based on the subscriber information, the mobile device identifier, and/or authentication information stored by an equipment identity register (block 640). For example, another device (e.g., EIR 255, or the like) may determine (e.g., generate, look up, etc.) an action indicator, and may provide the action indicator to HSS 245. HSS 245 may receive the action indicator, and may perform an action based on the action indicator. For example, HSS 245 may provide the action indicator to a device, for the device to route the action indicator toward mobile device 205 and/or to perform an action.

In some implementations, the action indicator may indicate to deny access to a service and/or network by mobile device 205. For example, EIR 255 may store authentication information indicating that mobile device 205 is blacklisted, and may generate an action indicator based on the authentication information. The action indicator may indicate to deny access to a network and/or network service by mobile device 205. In some implementations, the action indicator may indicate to drop a network connection with mobile device 205, in order to force mobile device 205 to attempt to reconnect to the LTE network via access network 210. In this way, EIR 255 may cause network devices to enforce a blacklist, which may improve security of the network.

In some implementations, the action indicator may indicate to monitor network traffic associated with mobile device 205. For example, EIR 255 may store authentication information indicating that mobile device 205 is greylisted (e.g., based on mobile device 205 being associated with questionable activities, based on mobile device 205 being a newly purchased device, etc.). In that case, EIR 255 may generate an action indicator indicating to permit mobile device 205 to access the core LTE network and/or to monitor network traffic associated with mobile device 205. In this way, EIR 255 may cause a device to monitor mobile device 205, which may give insight into network operation and/or actions performed by and/or associated with mobile device 205.

In some implementations, the action indicator may indicate to permit mobile device 205 to access the core LTE network and/or a network service. For example, EIR 255 may store authentication information indicating that mobile device 205 is whitelisted (e.g., based on mobile device 205 being trusted by a network provider). In some implementations, EIR 255 may determine that mobile device 205, associated with the mobile device identifier, is attempting to access an emergency service (e.g., E911 or the like). In this case, EIR 255 may provide an action indicator permitting mobile device 205 to access the emergency service, regardless of whether the stored authentication information indicates that mobile device 205 is whitelisted, greylisted, or blacklisted. In this way, a network operator may implement an authentication system to ensure mobile device 205 is capable of accessing the emergency service when communicating via different types of access networks (e.g., LTE access network 210-1, WiFi access network 210-2, etc.).

In some implementations, an action indicator may indicate a combination of the above actions. For example, a first action indicator may indicate to permit mobile device 205 to access a first service and to deny mobile device 205 access to a second service. As another example, a second action indicator may indicate to permit mobile device 205 access to a service, to permit a first user that uses mobile device 205 to access the service, and to deny a second user that uses mobile device 205 access to the same service.

In some implementations, the action indicator may cause mobile device 205 to perform an action. For example, after causing a network device to disconnect mobile device 205, the action indicator may cause mobile device 205 to reconnect to the LTE network (e.g., via base station 215). At this point, EIR 255 may perform and/or cause another device to perform one or more actions based on information stored by EIR 255 (e.g., may block mobile device 205 from accessing the network based on a blacklist, may monitor access by mobile device 205 based on a greylist, may permit mobile device 205 to access the network based on a whitelist, may permit mobile device 205 to access a network service such as an E911 service, etc., as described in more detail above).

As further shown in FIG. 6, process 600 may include providing the action indicator and/or the subscriber information to cause a device to perform the action (block 650). For example, HSS 245 may provide the action indicator and/or the subscriber information to another device. The other device may perform an action indicated by the action indicator, may route the action indicator to yet another device, or the like. By providing the action indicator and/or the subscriber information to the other device, HSS 245 may cause a device to perform an action related to mobile device 205 and/or a user. In some implementations, HSS 245 or another device may provide the action indicator to mobile device 205. The action indicator may cause mobile device 205 to perform an action (e.g., end a connection with access network 210, attempt to reconnect to the core LTE network via access network 210, etc.), as described in more detail above.

In some implementations, HSS 245 may provide the action indicator based on a source of a mobile device identifier associated with the action indicator. For example, assume that HSS 245 receives the mobile device identifier via wireless access device 220. HSS 245 may store information indicating that HSS 245 received the mobile device identifier via wireless access device 220, and may provide the action indicator to one or more network devices based on receiving the mobile device identifier via wireless access device 220 (e.g., AAA 250, PDG 225, etc.). As another example, assume that HSS 245 receives the mobile device identifier via base station 215. In that case, HSS 245 may provide the action indicator to one or more network devices for routing the action indicator toward base station 215, such as MME 230, or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
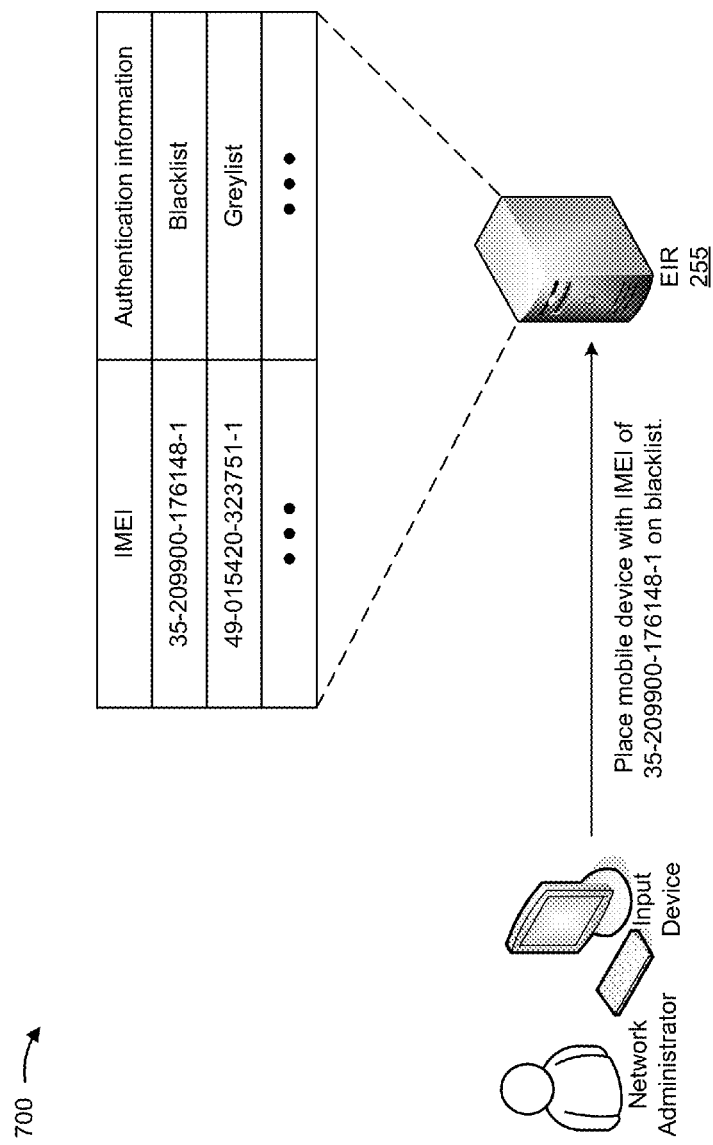
FIGS. 7A-7C are diagrams of an example implementation relating to the example process shown in FIG. 6.
Figure 7B:
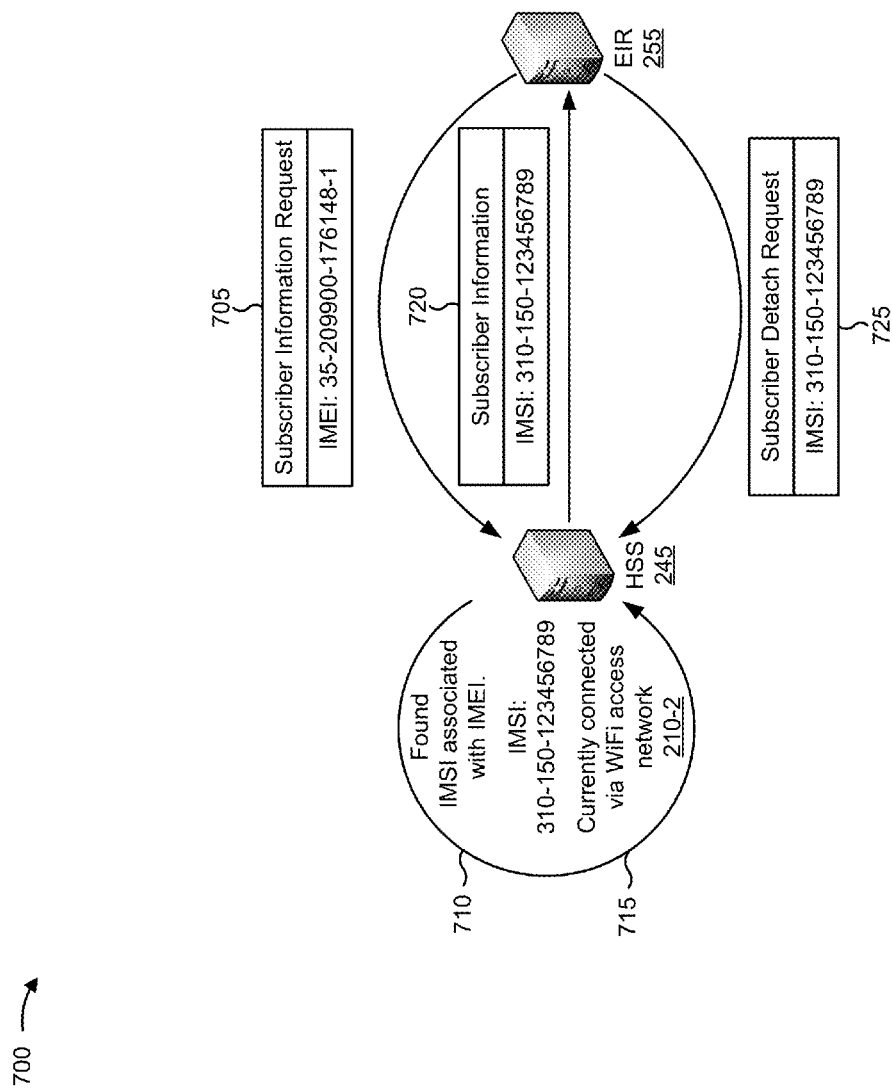
Figure 7C:
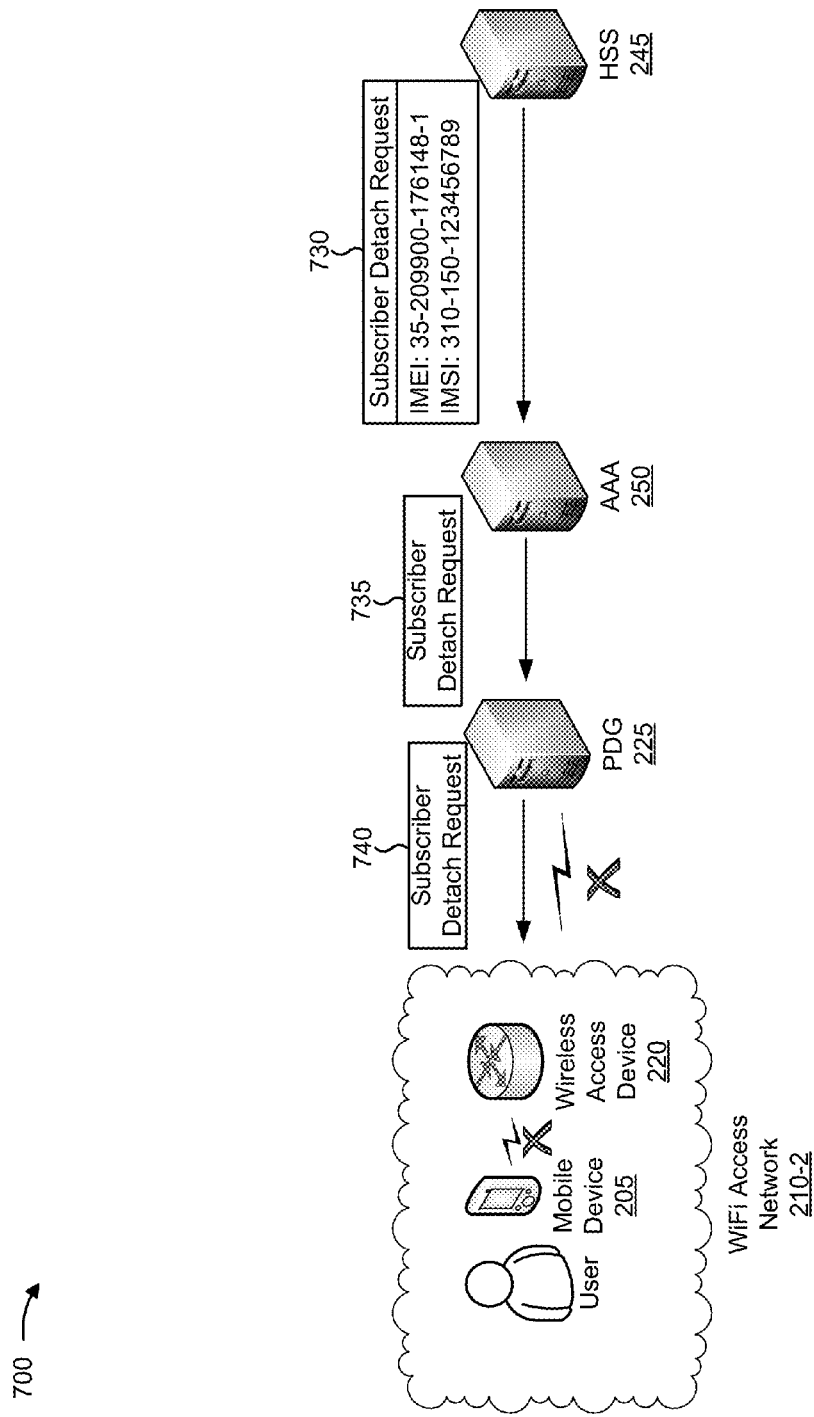

FIGS. 7A-7C are diagrams of an example implementation 700 relating to example process 600 shown in FIG. 6. FIGS. 7A-7C show an example of receiving and/or providing an action indicator based on a mobile device identifier and/or subscriber information. For the purpose of FIGS. 7A-7C, assume that the operations described in association with FIG. 5 have been performed. That is, assume that HSS 245 receives, via WiFi access network 210-2, a mobile device identifier (e.g., an IMEI of 35-209900-176148-1) and subscriber information associated with a user of mobile device 205 (e.g., an IMSI of 310-150-123456789). Assume further that HSS 245 stores the IMEI and the IMSI in association.

As shown in FIG. 7A, a network administrator may provide, using an input device and to EIR 255, information indicating to add, to a blacklist, the mobile device identifier associated with mobile device 205 (e.g., the IMEI of 35-209900-176148-1). Assume that the network administrator provides the information indicating to add the mobile device identifier, associated with mobile device 205, to a blacklist based on an owner of mobile device 205 reporting that mobile device 205 has been stolen. As shown, EIR 255 may store the mobile device identifier in the blacklist.

As shown in FIG. 7B, and by reference number 705, EIR 255 may provide, to HSS 245, a subscriber information request that includes the IMEI. Assume that EIR 255 provides the subscriber information request based on the mobile device identifier being blacklisted. Assume further that the subscriber information request requests subscriber information associated with the IMEI. As shown by reference number 710, assume that, based on the subscriber information request, HSS 245 determines the IMSI associated with the IMEI. Assume that HSS 245 determines the IMSI based on a stored association between the IMEI of 35-209900-176148-1 and the IMSI of 310-150-123456789. As shown by reference number 715, HSS 245 may determine that mobile device 205 is connected to the core LTE network via WiFi access network 210-2.

As shown by reference number 720, HSS 245 may provide, to EIR 255, the subscriber information (e.g., the IMSI of 310-150-123456789). Assume that EIR 255, based on the subscriber information and based on the IMEI being blacklisted, generates an action indicator to cause a network device to end a network connection with mobile device 205 (e.g., shown as Subscriber Detach Request). As shown by reference number 725, EIR 255 may provide the Subscriber Detach Request to HSS 245 (e.g., for routing toward mobile device 205). Assume further that HSS 245 determines the IMEI associated with the IMSI (e.g., to facilitate routing the Subscriber Detach Request toward mobile device 205).

As shown in FIG. 7C, and by reference number 730, HSS 245 may provide the Subscriber Detach Request to AAA 250. Assume that HSS 245 provides the Subscriber Detach Request to AAA 250 based on mobile device 205 being associated with WiFi access network 210-2 (i.e., a non-LTE access network 210). In some implementations, HSS 245 may provide the Subscriber Detach Request to another device (e.g., MME 230, etc.) based on mobile device 205 being associated with base station 215 and LTE access network 210-1. As shown by reference number 735, AAA 250 may provide the Subscriber Detach Request to PDG 225. Assume that AAA 250 provides the Subscriber Detach Request to PDG 225 based on mobile device 205 being associated with WiFi access network 210-2.

As shown by reference number 740, PDG 225 may provide the Subscriber Detach Request to wireless access device 220. Assume that PDG 225 provides the Subscriber Detach Request to wireless access device 220 based on an SWu logical interface between mobile device 205 and PDG 225. As shown, the Subscriber Detach Request may cause PDG 225 and/or wireless access device 220 to end a network connection with mobile device 205.

In some cases, mobile device 205 may attempt to reconnect to the core LTE network (e.g., via base station 215 and/or wireless access device 220). In such cases, a network device (e.g., MME 230, AAA 250, etc.) may request, from EIR 255 and based on mobile device 205 attempting to reconnect to the LTE network, authentication information associated with the mobile device identifier that identifies mobile device 205. EIR 255 may determine authentication information that indicates to deny a network connection with mobile device 205 (e.g., based on mobile device 205 being blacklisted). Based on the authentication information, the network device may not permit mobile device 205 to reconnect to the network.

As indicated above, FIGS. 7A-7C are provided merely as an example. Other examples are possible and may differ from what was described with regard to FIGS. 7A-7C.

Figure 8:
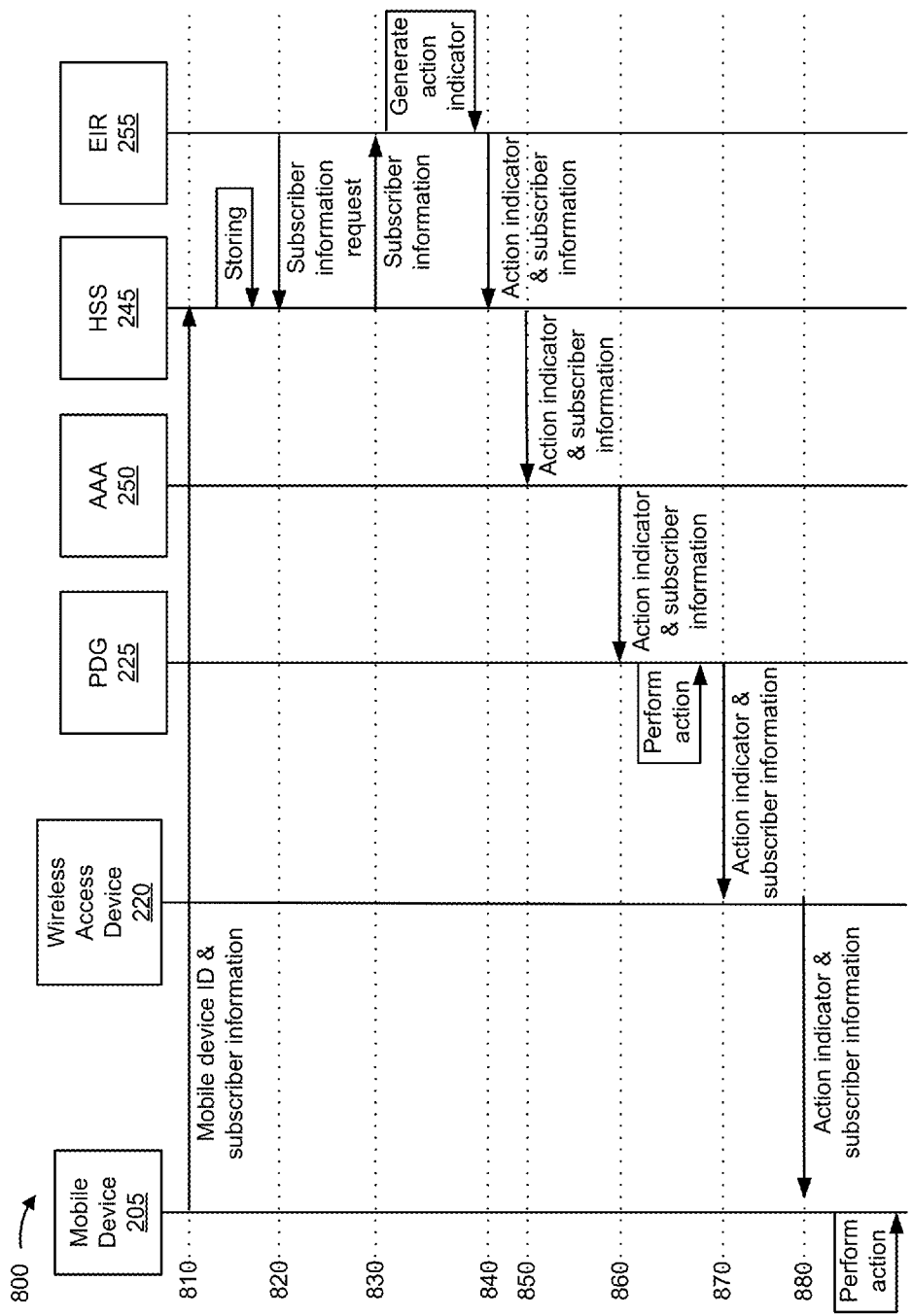
FIG. 8 is a diagram of an example call flow for receiving and/or providing an action indicator based on a mobile device identifier and/or subscriber information.

FIG. 8 is a diagram of an example call flow for receiving and/or providing an action indicator based on a mobile device identifier and/or subscriber information.

As shown by reference number 810, call flow 800 may include providing, by mobile device 205 and to HSS 245, a mobile device identifier and subscriber information. As further shown, HSS 245 may store the mobile device identifier and the subscriber information.

As shown by reference number 820, call flow 800 may include providing, by EIR 255 and to HSS 245, a subscriber information request. Assume that the subscriber information request includes the mobile device identifier stored by HSS 245. As shown by reference number 830, call flow 800 may include providing, by HSS 245 and to EIR 255, the subscriber information associated with the mobile device identifier. As further shown, based on the subscriber information, EIR 255 may generate an action indicator.

As shown by reference number 840, call flow 800 may include providing, by EIR 255 and to HSS 245, the action indicator and the subscriber information. Assume that HSS 245 routes the action indicator toward mobile device 205. As shown by reference number 850, call flow 800 may include providing, by HSS 245 and to AAA 250, the action indicator and the subscriber information. As shown by reference number 860, call flow 800 may include providing, by AAA 250 and to PDG 225, the action indicator and the subscriber information. As further shown, in some implementations, PDG 225 may perform an action based on the action indicator.

As shown by reference number 870, call flow 800 may include providing, by PDG 225 and to wireless access device 220, the action indicator and the subscriber information. As further shown, in some implementations, wireless access device 220 may perform an action based on the action indicator. As shown by reference number 880, call flow 800 may include providing, by wireless access device 220 and to mobile device 205, the action indicator. As further shown, in some implementations, mobile device 205 may perform an action based on the action indicator.

As indicated above, FIG. 8 is provided merely as an example. Other examples are possible and may differ from what was described with regard to FIG. 8.

Implementations described herein may enable network devices of a core LTE network to determine a mobile device identifier that identifies mobile device 205 via a non-LTE access network 210. Based on the mobile device identifier, the network devices may determine an action indicator, and/or may perform an action based on the action indicator. The network devices may end an existing network connection with a blacklisted mobile device 205, may monitor network traffic associated with a greylisted mobile device 205, may permit a whitelisted mobile device 205 to connect to the LTE network and/or access a service provided via the LTE network, or the like. In this way, the network devices may enforce authentication and/or policy rules for mobile devices 205 connecting to the core LTE network via non-LTE access networks 210.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information.

Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a communication interface;
   one or more processors; and
   a memory storing instructions that, when executed by the one or more processors, cause the one or more processors to:
      receive a mobile device identifier from a mobile device via a secondary access network,
         the mobile device identifier identifying the mobile device that is connected to the secondary access network, and
         the mobile device identifier including at least one of:
            an International Mobile Station Equipment Identity (IMEI),
            a mobile equipment identifier (MEID),
            an electronic serial number (ESN),
            a mobile directory number (MDN),
            a media access control (MAC) address, or
            a serial number;
      determine subscriber information associated with the mobile device identifier,
         the subscriber information identifying one or more users associated with the mobile device, and
         the subscriber information including at least one of:
            a subscriber identity module (SIM),
            a uniform resource identifier (URI),
            a mobile identification number (MIN),
            an International Mobile Subscriber Identity (IMSI),
            a mobile subscriber integrated services digital network (MSISDN) identifier, or
            a national access identifier (NAI);
      provide the mobile device identifier and the subscriber information for determination of an action indicator,
         the action indicator indicating an action to perform with respect to the mobile device identifier,
         the action including at least one of:
            ending a network connection with the mobile device,
            monitoring the network connection with the mobile device,
            denying access to a first network service for the mobile device, or
            permitting the mobile device to access a second network service,
               the second network service including an emergency service;
      receive the action indicator based on providing the mobile device identifier and the subscriber information; and
      provide the action indicator for routing toward the mobile device or for performance of the action.

2. The device of claim 1, where the secondary access network is an access network other than a long term evolution access network.

3. The device of claim 1, where the one or more processors are further to:
   determine an association between the mobile device identifier and the subscriber information; and
   store the mobile device identifier in association with the subscriber information; and
   where the one or more processors, when determining the subscriber information associated with the mobile device identifier, are to:
   determine the subscriber information based on the association between the mobile device identifier and the subscriber information.

4. The device of claim 1, where the one or more processors, when providing the mobile device identifier and the subscriber information, are to:
   provide the mobile device identifier and the subscriber information to an equipment identity register to cause the action indicator to be determined based on authentication information associated with at least one of the mobile device identifier or the subscriber information.

5. The device of claim 1, where the one or more processors, when receiving the mobile device identifier, are to:
   receive the mobile device identifier based on the mobile device attempting to access the first network service; and
   where the one or more processors, when receiving the subscriber information, are to:
   receive the subscriber information based on the mobile device attempting to access the first network service.

6. The device of claim 5, where the emergency service is an Enhanced 911 service; and
   where the action indicator indicates to permit the mobile device to access the Enhanced 911 service.

7. The device of claim 1, where the action indicator indicates an action to perform with respect to a plurality of mobile device identifiers,
   the mobile device identifier being one of the plurality of mobile device identifiers.

8. A computer-readable medium storing instructions, the instructions comprising:
one or more instructions that, when executed by one or more processors of a device, cause the one or more processors to:
receive, from a mobile device and via a secondary access network, a mobile device identifier and subscriber information associated with the mobile device identifier,
the mobile device identifier identifying the mobile device connected to the secondary access network,
the mobile device identifier including at least one of:
an International Mobile Station Equipment Identity (IMEI),
a mobile equipment identifier (MEID),
an electronic serial number (ESN),
a mobile directory number (MDN),
a media access control (MAC) address, or
a serial number,
the subscriber information identifying a user associated with the mobile device, and
the subscriber information including at least one of:
a subscriber identity module (SIM),
a uniform resource identifier (URI),
a mobile identification number (MIN),
an International Mobile Subscriber Identity (IMSI),
a mobile subscriber integrated services digital network (MSISDN) identifier, or
a national access identifier (NAI);
receive a subscriber information request that includes the mobile device identifier and that requests the subscriber information;
provide the subscriber information for determination of an action indicator,
the action indicator indicating an action to perform with respect to at least one of the mobile device or the subscriber,
the action including at least one of:
ending a network connection with the mobile device,
monitoring the network connection with the mobile device,
denying access to a first network service for the mobile device, or
permitting the mobile device to access a second network service,
the second network service including an emergency service;
receive the action indicator based on providing the subscriber information; and
provide the action indicator for routing toward the mobile device or for performance of the action.

9. The computer-readable medium of claim 8, where the one or more instructions, that cause the one or more processors to provide the subscriber information, cause the one or more processors to:
provide the subscriber information to an equipment identity register to cause the action indicator to be determined based on authentication information associated with at least one of the mobile device identifier or the subscriber information.

10. The computer-readable medium of claim 8, where the mobile device is attempting to access an Enhanced 911 network service; and
where the action indicator indicates to permit the mobile device to access the Enhanced 911 network service.

11. The computer-readable medium of claim 8, where the action indicator indicates an action to perform with respect to a plurality of mobile device identifiers,
the mobile device identifier received via the secondary access network being one of the plurality of mobile device identifiers.

12. The computer-readable medium of claim 8, where the one or more instructions, that cause the one or more processors to provide the action indicator, cause the one or more processors to:
provide the action indicator to one or more devices associated with the secondary access network to cause the action to be performed.

13. The computer-readable medium of claim 8, where the secondary access network is an access network other than a long term evolution network.

14. A method, comprising:
receiving, by a first device and via an access network, a mobile device identifier,
the mobile device identifier identifying a mobile device that is associated with the access network and that is associated with a user, and
the mobile device identifier including at least one of:
an International Mobile Station Equipment Identity (IMEI),
a mobile equipment identifier (MEID),
an electronic serial number (ESN),
a mobile directory number (MDN),
a media access control (MAC) address, or
a serial number;
receiving, by the first device and from a second device, a request, for subscriber information, that includes the mobile device identifier,
the subscriber information identifying the user, and
the subscriber information including at least one of:
a subscriber identity module (SIM),
a uniform resource identifier (URI),
a mobile identification number (MIN),
an International Mobile Subscriber Identity (IMSI),
a mobile subscriber integrated services digital network (MSISDN) identifier, or
a national access identifier (NAI);
determining, by the first device, the subscriber information based on an association between the mobile device identifier and the subscriber information;
providing, by the first device and to the second device, the subscriber information;
receiving, by the first device and based on providing the subscriber information, an action indicator,
the action indicator indicating one or more actions to perform with regard to at least one of the mobile device or the user,
the action including at least one of:
ending a network connection with the mobile device,
monitoring the network connection with the mobile device,
denying access to a first network service for the mobile device, or
permitting the mobile device to access a second network service,
the second network service including an emergency service; and
providing, by the first device, the action indicator to one or more third devices to cause at least one of the one or more third devices to perform the one or more actions.

15. The method of claim 14, where receiving the mobile device identifier via the access network comprises:

receiving the mobile device identifier from a fourth device based on a logical interface between the mobile device and the fourth device.

16. The method of claim 14, where the action indicator includes a plurality of mobile device identifiers,
the action indicator indicating an action to perform with regard to the plurality of mobile device identifiers, and
the mobile device identifier being one of the plurality of mobile device identifiers.

17. The method of claim 14, further comprising:
receiving, in association with the mobile device identifier and via the access network, the subscriber information; and
determining an association between the mobile device identifier and the subscriber information.

18. The method of claim 14, further comprising:
performing at least one of the one or more actions indicated by the action indicator.

19. The method of claim 14, where the access network includes an access network other than a long term evolution network.

20. The computer-readable medium of claim 8, where the mobile device is blacklisted from a service provider network.

* * * * *